United States Patent [19]

Suzuki et al.

[11] Patent Number: 5,049,824
[45] Date of Patent: Sep. 17, 1991

[54] PHASE DISCRIMINATION TYPE ELECTROSTATIC CAPACITY DETECTOR

[75] Inventors: Mikio Suzuki, Kawasaki; Satoshi Ishihara, Ageo, both of Japan

[73] Assignee: Mitutoyo Corp., Tokyo, Japan

[21] Appl. No.: 446,419

[22] Filed: Dec. 5, 1989

[30] Foreign Application Priority Data

Dec. 12, 1988 [JP] Japan .................. 63-161095[U]
Dec. 12, 1988 [JP] Japan .................. 63-313315

[51] Int. Cl.$^5$ .................................................. G01R 27/26
[52] U.S. Cl. .................................. 324/660; 324/662; 324/725; 340/870.37
[58] Field of Search ............... 324/660, 683, 690, 725, 324/680, 662; 340/870.37

[56] References Cited

U.S. PATENT DOCUMENTS

| 3,961,318 | 6/1976 | Farrand et al. | 324/725 X |
|---|---|---|---|
| 4,420,754 | 12/1983 | Andermo | 324/725 X |
| 4,429,307 | 1/1984 | Fortescue | 324/725 X |
| 4,449,179 | 5/1984 | Meyer | 324/725 X |
| 4,633,249 | 12/1986 | Sasaki | |

FOREIGN PATENT DOCUMENTS 0226716 1/1987 European Pat. Off. .

Primary Examiner—Kenneth A. Wieder
Assistant Examiner—Robert W. Mueller
Attorney, Agent, or Firm—Oliff & Berridge

[57] ABSTRACT

A phase discrimination type electrostatic capacity detector includes an one-side electrode plate composed of a transmitting electrode and a receiving electrode, another-side electrode plate having coupling electrodes and disposed relatively movably with respect to the one-side electrode plate in a confronting relation with the same, a power supply connected to the transmitting electrode, and a detector circuit connected to the receiving electrode. The detector is miniaturized by disposing the transmitting electrode in a second hierarchy layer partitioned by an electrical insulating layer on a substrate and connecting in series the respective transmitting electrode elements of the same phase in a first hierarchy layer through coupling leads. The detector including a pair of receiving electrode elements between which the transmitting element is interposed, is miniaturized by leading out the coupling leads to one side end of the one-side electrode plate through a space between both receiving electrode elements.

4 Claims, 9 Drawing Sheets

FIG. 6
FIG. 7
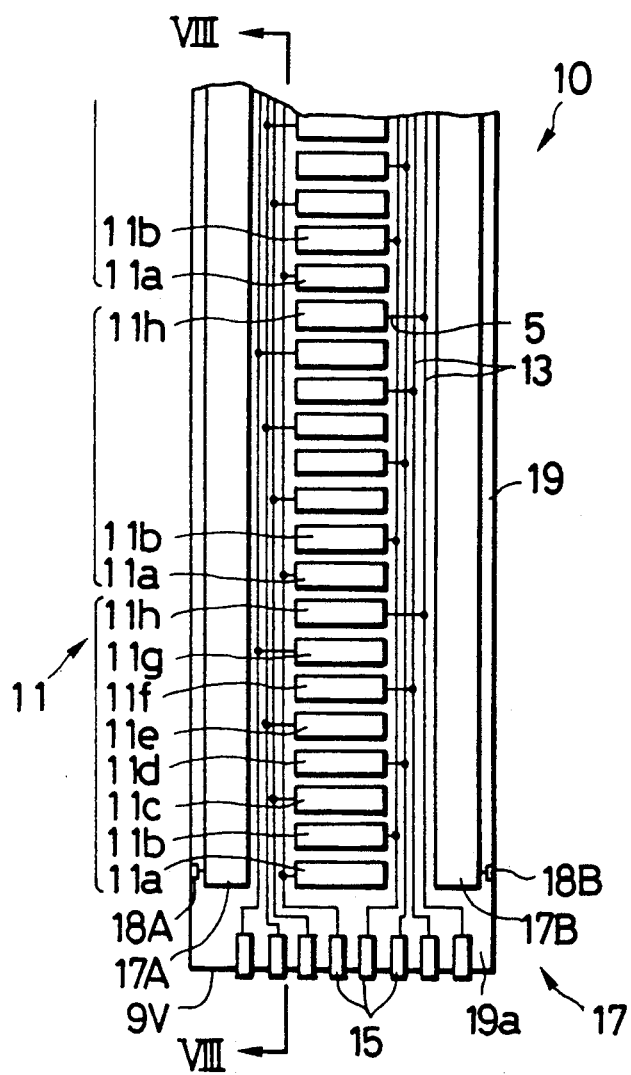
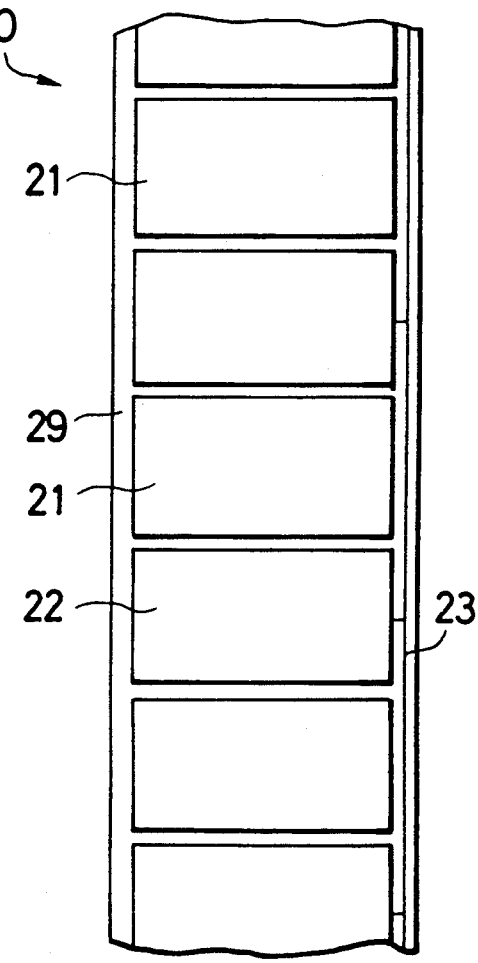

FIG. 16
PRIOR ART
FIG. 17
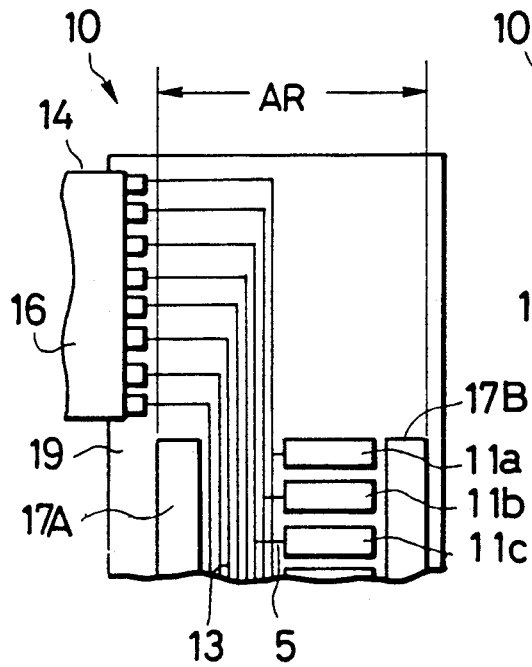
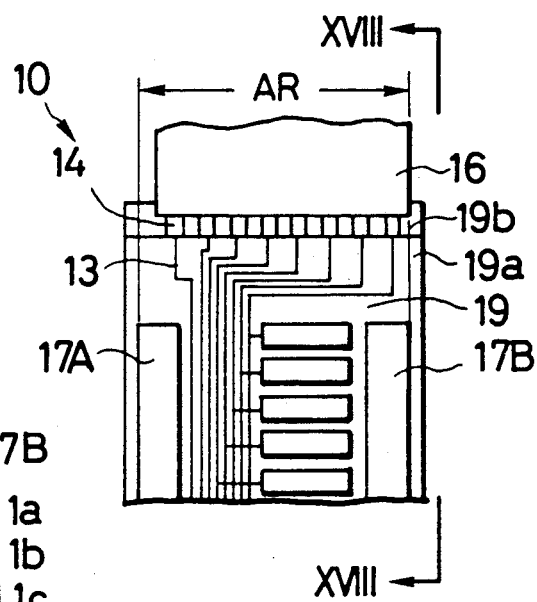
FIG. 18
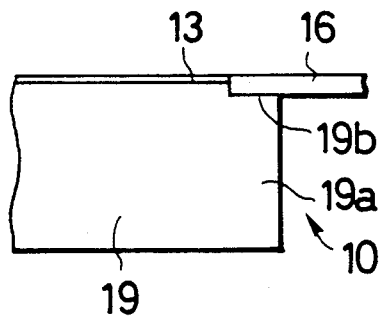

PHASE DISCRIMINATION TYPE ELECTROSTATIC CAPACITY DETECTOR

BACKGROUND OF THE INVENTION

1. Field of the Invention

The present invention relates to a phase discrimination type electrostatic capacity detector. More specifically, the present invention relates to a miniaturization of the detector in which a one-side electrode plate including transmitting and receiving electrodes and another-side electrode plate including a coupling electrode are disposed relatively movably in a confronting relation, with a power supply of different phases applied to the respective transmitting electrode elements to discriminate the phase of an electric signal induced on the receiving electrode for detection of a change in electrostatic capacity coupling therebetween. Such a detector is applicable to a displacement detector and a length measuring device.

2. Description of the Prior Art

Referring to FIGS. 10 to 13, a prior phase discrimination type electrostatic capacity detector is illustrated in general construction.

As illustrated in FIG. 10, the phase discrimination type electrostatic capacity detector comprises a one-side electrode plate 10, a other-side electrode plate 20, a power supply 30 and a detector circuit 40.

The one-side electrode plate 10 includes a transmitting electrode 11 composed of a plurality of transmitting electrode element units (transmitting electrode elements 11a to 11h) and a receiving electrode 17. The transmitting electrode elements of the same phase (11a, 11a, ... for example) are connected to coupling leads 13 through extension leads 5 and further connected to the power supply 30 through a flexible wiring 16, respectively, as illustrated in FIG. 12.

The receiving electrode 17 is connected to the detector circuit 40 through an output lead 18.

In contrast, the other-side electrode plate 20 includes, as illustrated in FIG. 13, a plurality of coupling electrodes 21 and a plurality of earth electrodes 22 mutually short-circuited by a short-circuit pattern 23, both being alternately arranged. Each coupling electrode 21 extends in its length over four transmitting electrode elements (11a to 11d, for example) and in its width from the transmitting electrode 11 to the receiving electrode 17.

Both electrode plates 10, 20 are disposed in a confronting relation, as illustrated in FIG. 11, and movable longitudinally (the face to the back of FIG. 11).

Herein, AR designates an electrostatic capacity coupling area. The respective leads 5, 13 are provided in a connection area other than the electrostatic capacity coupling area AR and connected to the flexible wiring 16.

The power supply 30 includes, as illustrated in FIG. 10, an oscillator 31 and a signal generator 32 for generating a plurality (8) of signals different in phase from each other. The detector circuit 40 includes an integrator 41, a comparator 42, an edge detector 43, a phase difference detector 44 for phase discrimination, a counter 45, and a display 47.

If the one-side electrode plate 10, the power supply 30, and the detector circuit 40 are mounted on a body of a dial gauge type length measuring instrument and the other-side electrode plate 20 is mounted on a spindle attached slidably to the body, the amount of displacement of the spindle can be read on the display 47.

Such a prior phase discrimination type electrostatic capacity detector is advantageous in reduced power consumption, high resistance to disturbance, and high resolution, compared with a photoelectric type detector and the like for example.

In such a prior detector, however, the same phase transmitting electrode elements (11a, 11a, ..., for example) are connected to the same coupling lead 13 through the respective extension leads 5, as illustrated in FIG. 12. In detail, as illustrated in FIG. 14, the extension lead 5 is disposed on a substrate 19 of the one-side electrode plate 10 as being the same level as the transmitting electrode element, and the respective coupling leads 13 are disposed above the extension lead 5 through the electrical insulating layer 1. Therefore, each extension lead 5 is connected to the coupling lead 13 through a connection terminal 6 which is yielded by forming a through-hole 3 through the electrical insulating layer 1.

Herein, as illustrated in FIG. 15, if the widths of the coupling lead 13 and the connection terminal 6 are assumed W and D, respectively, then the width D falls within 0.1 to 0.2 mm owing to the restriction of the through-hole 3 in view of processing of the same although the width W suffices to be 0.03 mm on the electrical characteristics. The former width D leads in case of eight phases to a size L needed to construct the overall coupling leads 13, which amounts to 0.9 to 1.9 mm that is excessively large compared with the width W (0.03 mm) of the single coupling lead 13, preventing the whole of the detector from being miniaturized.

Such a prior detector is therefore not applicable to a handy small-sized length measuring instrument and the like, for example. Even though the size of the through-hole 3 is reduced, difficulty of processing thereof produces bad yield and makes the device costly. Formation of many through-holes 3 is not only expensive in itself but is liable to cause broken wiring. Further, since the connection area between the coupling lead 13 and the extension lead 5 is located on the side of the transmitting electrode 11, the lateral size of the one-side electrode plate 10 is further increased and prevented from being miniaturized also from this point of view.

On the contrary, in order to make such a prior phase discrimination type electrostatic capacity detector more stable and accurate in characteristics thereof, it is sufficient to make a relative positional relation between both electrode plates 10, 20 accurate.

To solve this, the present applicant has previously proposed a detector system in Japanese Utility Model Application No. 63-199690 (not laid-open yet), for securely increasing the stability of electrostatic capacity coupling between the coupling electrode 21 and the transmitting and receiving electrodes 11, 17 or improving parallelism therebetween more positively. The detector system comprises the receiving electrode 17 composed of a couple of the receiving electrode elements 17A, 17B, between which the transmitting electrode 11 is interposed, and parallelism detector means 50 composed of couple of integrators 51A, 51B connected to the receiving electrode elements, respectively, a comparator 52 and a meter 53, as illustrated within FIG. 3 partially. Herein, designated at 46 is an adder.

Such a detector, which includes the couple of the receiving electrode elements 17A, 17B incorporating the transmitting electrode 11 therebetween, however, has problems that the device becomes large-sized and it is difficult to be executed technically and uneconomical to process the device.

Specifically, the respective extension leads 5 and the coupling leads 13 are difficult in their formation as patterns on the side of the transmitting electrode 11 and outside the electrostatic capacity coupling area AR, as illustrated in FIG. 11. Accordingly, they must be laid to go around the transmitting electrode 11 and the receiving electrode 17 (17A, 17B) for away therefrom longitudinally, as illustrated in FIG. 16. Thus, the one-side electrode plate 10 is not only excessively long and costly, but also limited in its application such that it can not be assembled into a handy measuring instrument, for example.

To form the coupling lead 13 within the electrostatic capacity coupling area AR, a structure may be thought as illustrated in FIGS. 17 and 18, wherein a stepped portion 19b is provided in one side end 19a of the substrate 19 which forms the one-side electrode plate 10 for connection of the flexible wiring 16 utilizing the recessed portion 19b. In the structure, however, since the substrate 19, which is made of a glass plate, must be processed in itself to form the stepped portion, a technique to process it is severe together with heavy economical loading and insufficient stability. Furthermore, if there is any dimensional error and bonding failure on the flexible wiring 16, the flexible wiring 16 is protruded into a gap between the coupling electrode 21, and the transmitting electrode 11 and the receiving electrode 17 to cause reduction of the reliability of the device such as impossibility of a smooth relative movement thereof and occurrence of unstable signals.

SUMMARY OF THE INVENTION

In view of the drawbacks of the prior arts, it is an object of the present invention to provide a phase discrimination type electrostatic capacity detector capable of achieving high accuracy, stable characteristics and operation, reduced cost, and miniaturization thereof.

In accordance with one aspect of the present invention, a plurality of the coupling leads are accomodated within the width of the transmitting electrode 11 and through-holes are greatly reduced.

More specifically, there is provided a phase discrimination type electrostatic capacity detector comprising a one-side electrode plate composed of a transmitting electrode and a receiving electrode, another-side electrode plate including a coupling electrode and disposed relatively movably with respect to the one-side electrode plate in a confronting relation with the same, a power supply connected to the transmitting electrode, and a detector circuit connected to the receiving electrode, the phase discrimination type electrostatic capacity detector being characterized in that a first hierarchy layer and a second hierarchy layer are defined on a substrate of the one-side electrode plate through an electrical insulating layer; a plurality of transmitting electrode elements of the transmitting electrode are disposed on the second hierarchy layer, including at least one end of the respective transmitting electrode elements penetrating the electrical insulating layer and extending to the first hierarchy layer; coupling leads are provided on the first hierarchy layer, through which the transmitting electrode elements of the same phase are serially connected to each other; and respective transmitting electrode elements of the same phase are supplied with an electric signal of the aforementioned phase from the power supply through the respective coupling leads.

In the construction of the present invention described above, the transmitting electrode is disposed on the second hierarchy layer defined on the one-side electrode plate (substrate) by the electrical insulating layer, and the respective transmitting electrode elements of the same phase are connected in series to each other on the first hierarchy layer beneath thereof. The device can thus be miniaturized. The invention therefore has some advantages: the detector of the present invention can be assembled with ease into a handy miniaturized length measuring instrument and can achieve high precision detection, and processing numbers of the through-holes can be reduced to assure electrical and mechanical durabilities, stability, and hence reliable operation, and reduced cost.

In accordance with the other aspect of the present invention, there is provided a phase discrimination type electrostatic capacity detector comprising an one-side electrode plate composed of a transmitting electrode and a receiving electrode including a couple of receiving electrode elements between which the transmitting electrode is intervened, another-side electrode plate including coupling electrodes and disposed relatively movably with repect to the one-side electrode plate in a confronting relation with the same, a power supply connected to the transmitting electrode, and a detector circuit connected to the receiving electrode, the phase discrimination type electrostatic capacity detector being characterized in that coupling leads which interconnect the transmitting electrode elements of the same phase among a plurality of transmitting electrode element units constituting the transmitting electrode are taken out at one side end of the one-side electrode plate through a space between both receiving electrode elements, and respective terminal leads provided on the tip ends of the respective coupling leads for interconnection between the power supply and the respective coupling leads are formed of conductive coatings located in close contact with a side or back surface of the one-side electrode plate.

In the construction of the present invention described above, since the respective coupling leads are taken out at a one side end of the one-electrode plate through a space between both receiving electrode elements, there is no need of enlarging the width of the one-side electrode plate. Further, since the respective terminal leads interconnecting the respective coupling leads, and the flexible wiring and the power supply are formed of conductive coatings located in close contact with the side or back surface of the one-side electrode plate, the detector can be miniaturized without being increased in its length, without protrusion of the flexible wiring into space between the electrodes and further without occurrence of a connection failure. Thus, there can be achieved cost reduction, easy assembling, and miniaturization of the detector, including highly accurate, stable, and reliable detection of a change in electrostatic capacity coupling keeping predetermined electrostatic capacity coupling and smooth relative movement between both electrode plates.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 6 is a plan view of FIG. 5, taken along a line VI—VI of the same figure;

FIG. 7 is a plan view of FIG. 5, taken along a line VII—VII of the same figure;

FIG. 16 is a plan view illustrating the one-side electrode plate when terminal leads are provided outside of an electrostatic capacity coupling area;

FIG. 17 is a plan view illustrating the one-side electrode plate when a stepped portion is provided for connecting the terminal leads and the flexible wiring; and FIG. 18 is a side view of the one-side electrode plate of FIG. 17, taken along a line XVIII—XVIII of FIG. 17.

DESCRIPTION OF THE PREFERRED EMBODIMENTS

In what follows, preferred embodiments of the present invention will be described with reference to the accompanying drawings.

Figure 1:
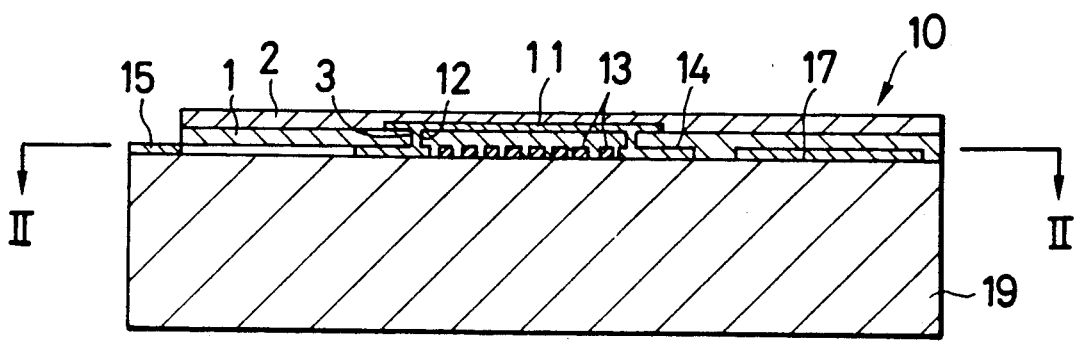
FIG. 1 is a longitudinal sectional view illustrating a one-side electrode plate in a first embodiment according to the present invention.
Figure 2:
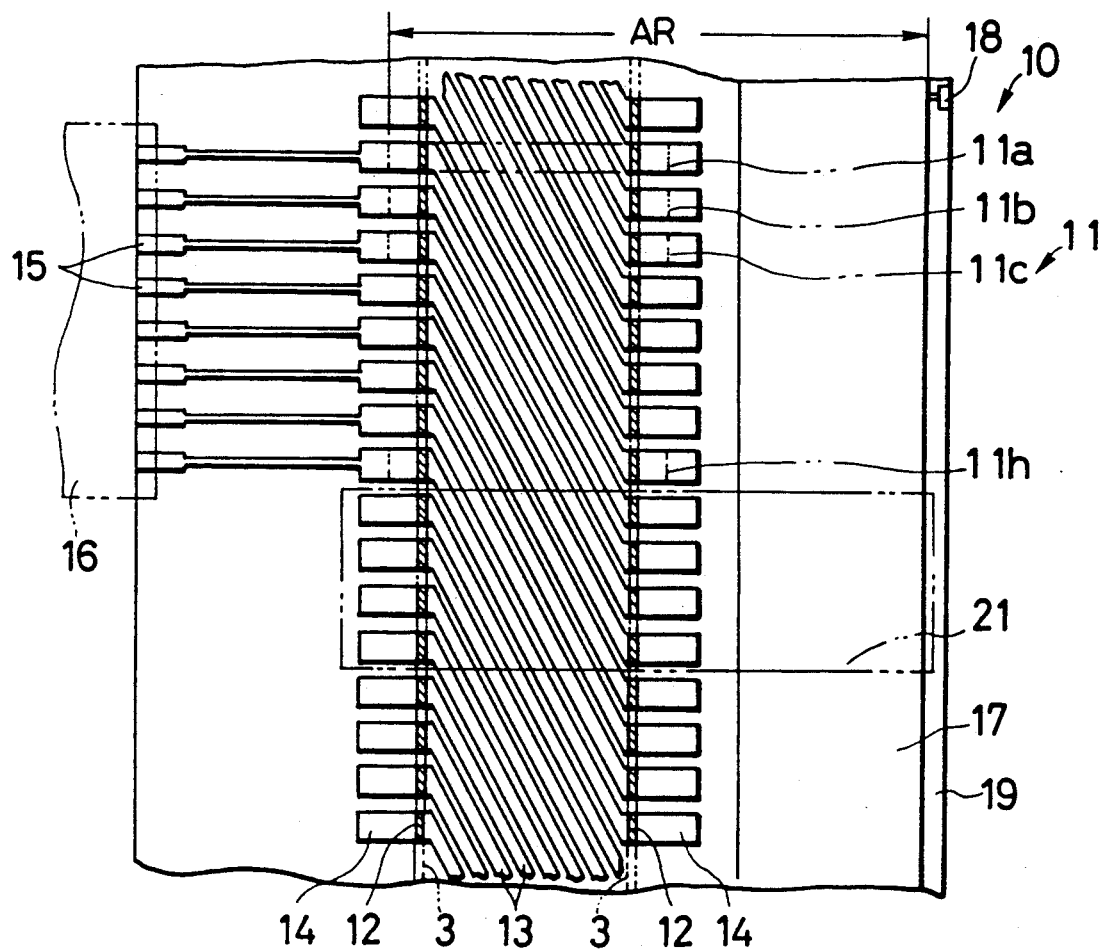
FIG. 2 is a plan view illustrating the one-side electrode plate of FIG. 1, partly omitted and taken along a line II—II of the same figure.

Referring to FIGS. 1 and 2, a phase discrimination type electrostatic capacity detector according to a first preferred embodiment of the present invention is illustrated.

As illustrated in the figures, the phase discrimination type electrostatic capacity detector comprises a one-side electrode plate 10, another-side electrode plate 20, a power supply 30, and a detector circuit 40.

Figure 10:
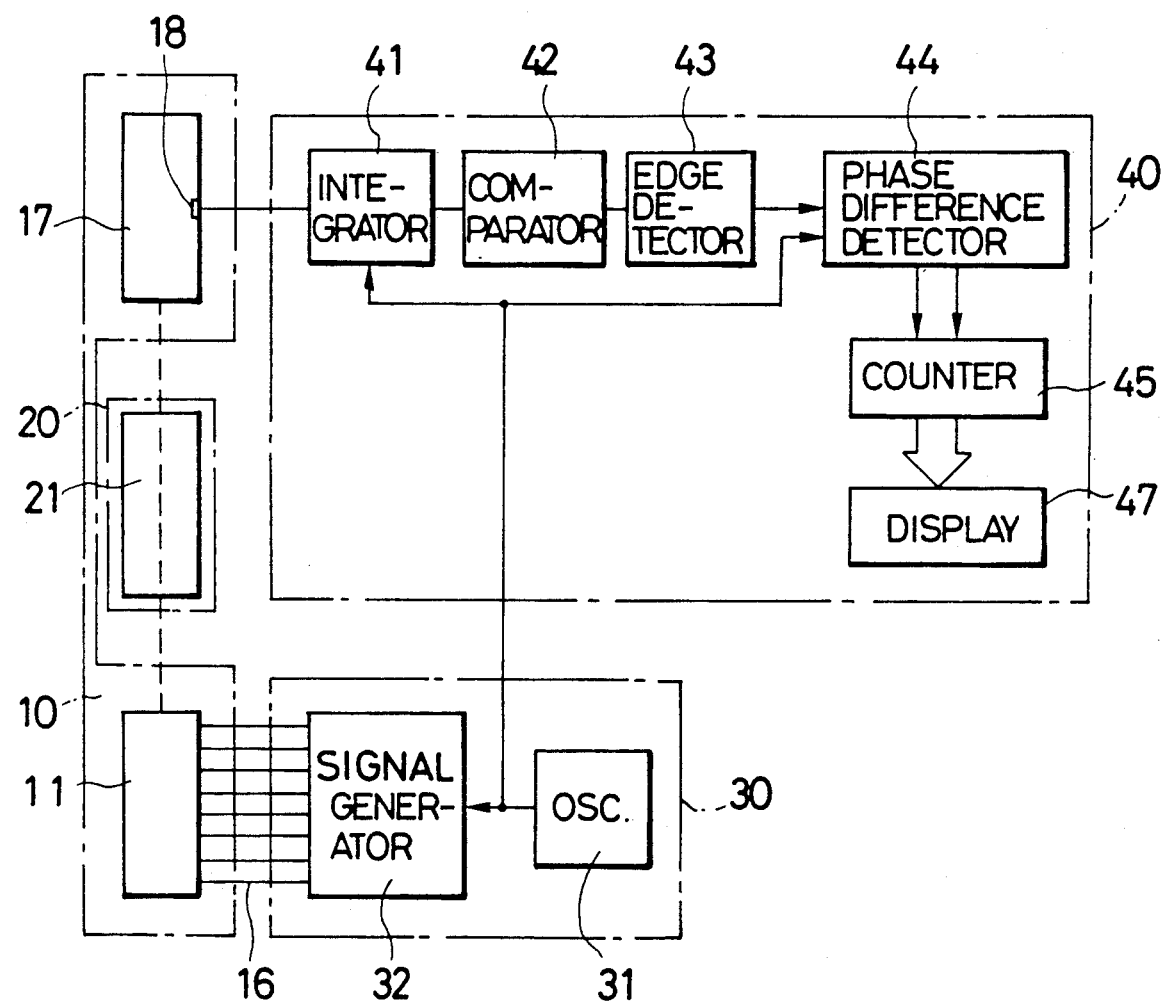
FIG. 10 is a block diagram illustrating the overall construction of a prior phase discrimination type electrostatic capacity detector.
Figure 11:
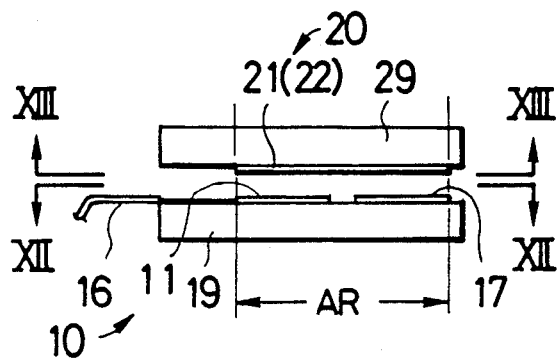
FIG. 11 is a view illustrating the situation of wiring of a one-side electrode plate and another-side electrode plate.

Herein, the power supply 30 and the detector circuit 40 are similar to the prior ones illustrated in FIG. 10, and hence illustration and description thereof will be omitted.

The one-side electrode plate 10 comprises, as illustrated in FIGS. 1 and 2, a substrate 19 made of a glass plate, a transmitting electrode 11 in which a plurality of transmitting electrode element units composed of a plurality of (eight in the embodiment) transmitting electrode elements 11a to 11h are arranged, and a receiving electrode 17 disposed in parallel to the transmitting electrode 11.

Figure 12:
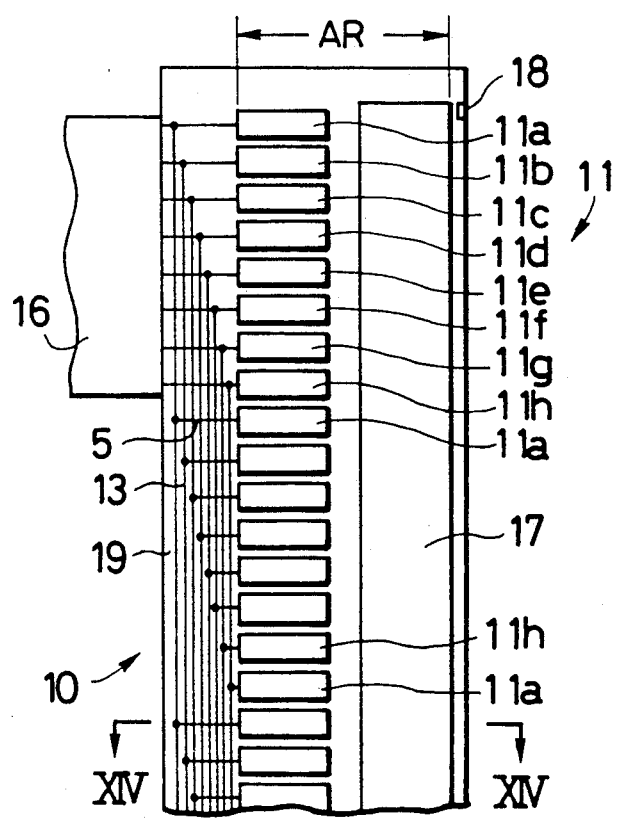
FIG. 12 is a plan view illustrating the one-side electrode plate of FIG. 11, partly omitted and taken along a line XII—XII of the same figure.

In contrast, the other-electrode plate 20 comprises, as the prior structure illustrated in FIG. 12, a substrate 29 made of a glass plate, a coupling electrode 21 with its length extending over four transmitting electrode elements (11a to 11d, 11e to 11h) and with its width extending from the transmitting electrode 11 to the receiving electrode 17, and earth electrodes 22 each of the same shape as that of the coupling electrode 21 disposed alternately with the coupling electrodes 21, the respective earth electrodes 22 being mutually short-circuitted through a short-circuit pattern 23.

The present invention has the following construction as a technical feature as illustrated in FIGS. 1 and 2: the transmitting electrode 11 is divided into two hierarchy layers, in the first one between which the respective transmitting electrode elements of the same phase are connected in series to each other by coupling leads 13 and supplied with an electric signal of the same phase from the power supply 30 through the coupling leads 13.

Specifically, the one-side electrode plate 10 is defined on the substrate 19 into the first and second hierarchy layers via a first electrical insulating layer 1 as illustrated in FIG. 1, and the respective transmitting electrode element units (11a to 11h) are disposed in the second hierarchy layer and above the first electrical insulating layer 1. Both opposite ends of the respective transmitting electrode elements penerate the first electrical insulating layer 1 made of a silicon dioxide (SiO$_2$) film into the first hierarchy layer. In more detail, a pair of extended slit-shaped through-holes 3, 3, which extend longitudinally of the substrate 19, are provided in the first electrical insulating layer 1, and the respective transmitting electrode elements are led to the first hierarchy layer through downwardly-extending leads 12, 12, which pass through the through-holes 3, 3, and fixed to the substrate 19 with the aid of coupling terminals 14, 14. Herein designated at AR is an electrostatic capacity coupling area.

The respective transmitting electrode elements 11a, 11a, ... 11b, 11b, ... 11c, 11c, ..., ... of the same phase are serially connected to each other through the coupling leads 13 of an oblique pattern.

If the power supply 30 is connected to any one of the coupling leads 13, then the electric signal of the same phase can be applied to all transmitting electrode elements (11a, 11a, ...) connected in series to that coupling lead 13. In the present embodiment, the coupling leads 13 are connected to the power supply 30 (signal generator 32) through the terminal leads 15 and the flexible wiring 16.

Herein, the transmitting electrode 11 is covered with a second electrical insulating layer 2 made of a silicon dioxide (SiO$_2$) film and hence is highly reliable.

Further, the receiving electrode 17 is disposed in the first hierarchy layer or on the substrate 19, as the coupling leads 13, the coupling terminals 14, and the terminal leads 15. In this instance, the receiving electrode 17 is covered doubly with the first and second electrical insulating layers 1, 2, and hence highly reliable. The receiving electrode 17 may however be provided in the second hierarchy layer or on the first electrical insulating layer 1 as the transmitting electrode 11.

In the phase discrimination type electrostatic capacity detector constructed as above, the one-side electrode plate 10 is mounted on a stationary body of a dial gauge type length measuring instrument, for example, together with the power supply 30 and the detector circuit 40, while the other-side electrode plate 20 is mounted on a movable spindle. Interconnection between the respective transmitting electrode elements (11a, 11b, . . .) and the power supply 30 may be performed by connecting flexible wiring 16 to the terminal leads 15 through the coupling leads 13 provided in the first hierarchy layer.

Successively, by turning the power supply 30 on to apply an electric signal to the respective transmitting electrode elements of the same phase through the flexible wiring 16, the terminal leads 15, and the coupling leads 13, the amount of displacement of the spindle with respect to the body can be detected and displayed on the display 47 of the detector circuit 40.

In accordance with the present embodiment, the transmitting electrode 11 is disposed in the second hierarchy layer partitioned by the electrical insulating layer 1 in the one-side electrode plate 10 while the respective transmitting electrode elements of the same phase are interconnected in series through the coupling leads 13 in the first hierarchy layer under the second hierarchy layer. The phase discrimination type electrostatic capacity detector can thus greatly be miniaturized, compared with the prior example illustrated in FIG. 12 wherein the connection area was provided outside the electrostatic capacity coupling area AR.

Additionally, in order to extend both opposite ends of the transmitting electrode elements into the first hierarchy layer, a pair of the slit-shaped through-holes 3, 3, may be provided. This assures cost reduction and miniaturization of the device even if the through-holes 3, 3 are of a relatively large size, resulting in a further improvement of the overall reliability of the device.

Figure 14:
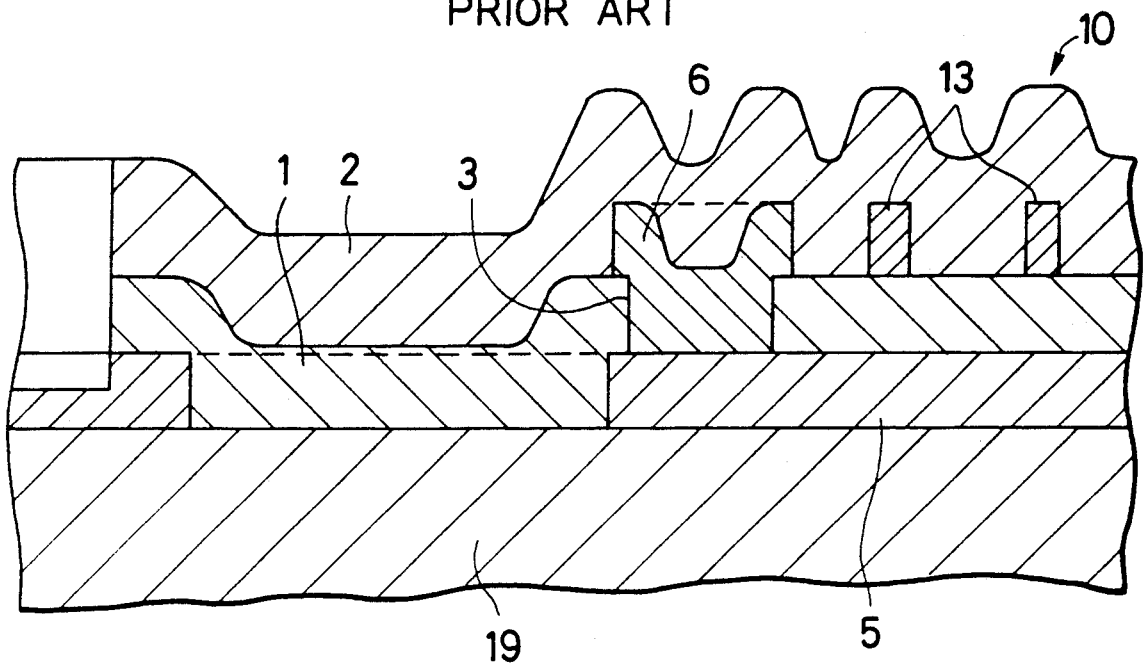
FIG. 14 is a longitudinal sectional view illustrating the one-side electrode plate of FIG. 11, partly omitted and taken along a line XIV—XIV of FIG. 12.

Furthermore, the respective coupling leads 13 are disposed obliquely parally to interconnect in series the transmitting electrode elements of the same phase. Accordingly, there is an enough space for the width of each coupling lead to improve the electrical and mechanical reliability of the device and sharply reduce the costs of processing. For example, with the coupling lead 13 assumed to have its line width W of 0.03 mm as in the prior case illustrated in FIG. 14, the size L in the present embodiment can be reduced to ⅓ or less.

Moreover, the respective transmitting electrode elements (11a, 11b, . . . ) have substantially the same width as that of the coupling terminals 14, 14 and are connected to a pair of the corresponding coupling terminals 14, 14 through the downward leads 12, 12. Accordingly, a pitch between the adjacent transmitting electrodes 11 can be made fine upon formation of those electrodes to assure high resolution measurement.

Additionally, there is no need for providing as many fine through-holes as the number of phases as in the prior case. Accordingly, the yield of processing can greatly be improved to ensure cost reduction and stability and reliability of the electrical characteristics.

Successively, a second preferred embodiment of the present invention will be described with reference to FIGS. 3 and 4.

The second embodiment is different from the first one in that a parallelism detector means 50 is provided anew and for this the structure of the one-side electrode plate 10 is modified. A power supply 30 and a detector circuit 40 are identical to those of the first embodiment except for incorporation of an adder 46 and hence the like symbols shall be applied to the like portions and description thereof will be omitted.

Figure 4:
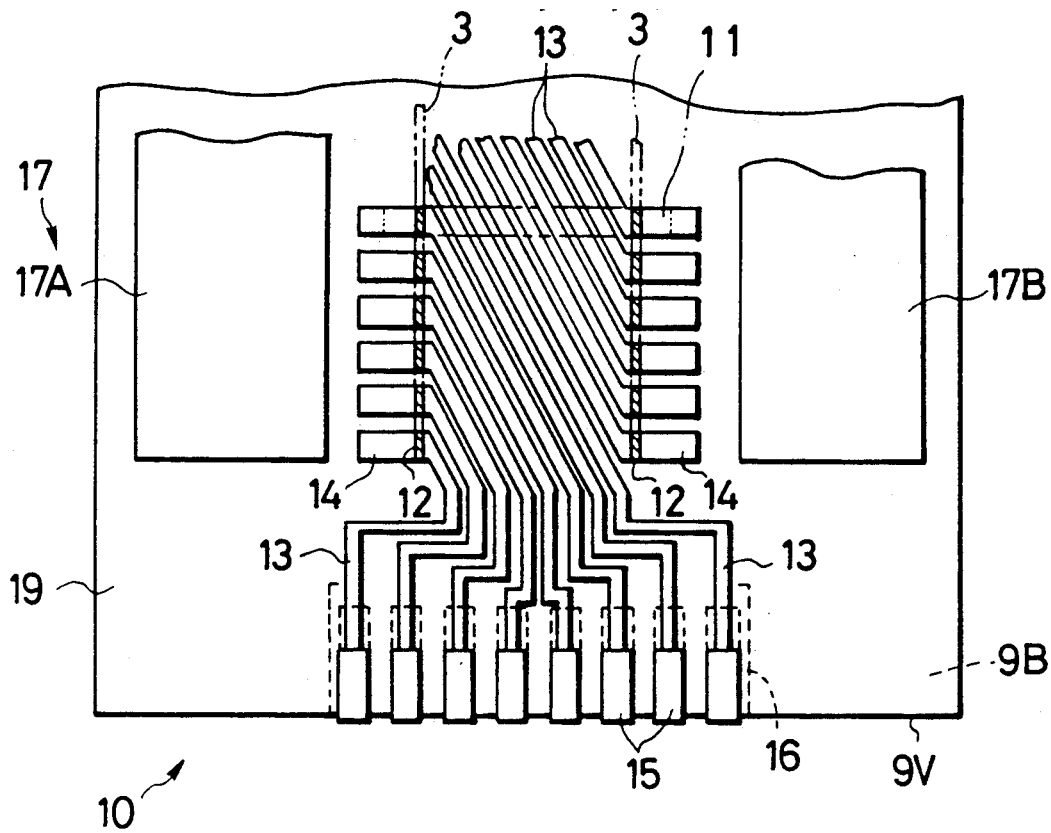
FIG. 4 is a plan view illustrating the one-side electrode plate of the second embodiment, partly omitted.
Figure 13:
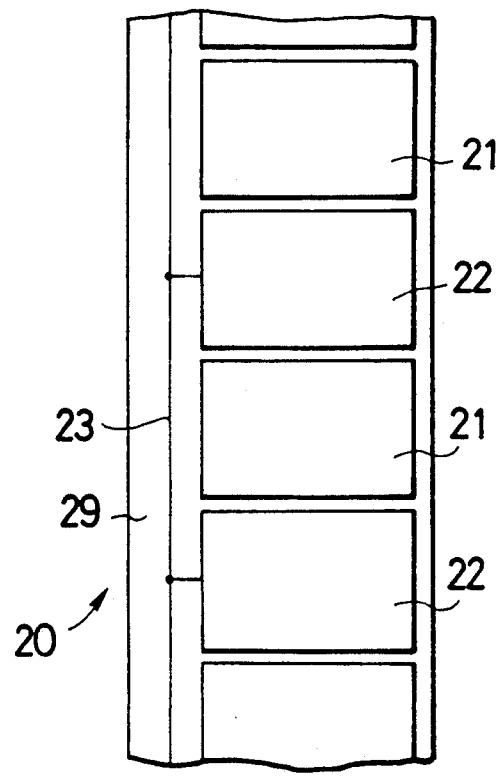
FIG. 13 is a plan view illustrating the other-side electrode plate of FIG. 11, partly omitted and taken along a line XIII—XIII of the same figure.

The one-side electrode plate 10 comprises, as illustrated in FIG. 4, a substrate 19 made of a glass plate, a transmitting electrode 11 including transmitting electrode element units composed of a plurality (eight) of transmitting electrode elements 11a to 11h, together disposed in order, and a pair of receiving electrode elements 17A, 17B, between which the transmitting electrode plate 11 is intervened in the width direction. Although the other-side electrode plate 20 is identical in its basic construction to the prior one illustrated in FIG. 13, the width of the coupling electrode 21 is defined to correspond to the total width of both receiving electrode elements 17A, 17B.

The respective transmitting electrode elements 11a, 11b, . . . disposed in a second hierarchy layer are interconnected in series to each other in a first hierarchy layer through coupling leads 13, as in the first embodiment. The respective coupling leads 13 are connected at their terminals to terminal leads 15 disposed extending to the side surface 9V and back surface 9B of the substrate 19. On the back surface 9b side, the flexible wiring 16 is connected to the respective terminal leads 15 which are further connected to the power supply 30.

The parallelism detector means 50 is to adjust parallelism between both electrode plates 10, 20 and detect a change in the parallelism during operation of the device when the other-side electrode plate 20 is incorporated into a concrete mechanism as in a case it is fixed to a spindle of a dial gauge type length measuring instrument, for example. As illustrated in FIG. 3, the parallelism detector means 50 compares signal levels charged in integrators 51A, 51B with use of a comparator 52 and visually indicates on a meter 53 a relative inclination between both electrode plates 10, 20 based upon the magnitude and direction of a difference between the signal levels. Into the respective integrators 51A, 51B signals induced on the corresponding receiving electrode elements 17A, 17B are inputted through output leads 18A, 18B.

Herein, the receiving electrode 17 has been constructed with a pair of the receiving electrode elements 17A, 17B in the present embodiment, for the purpose of, besides that of the disposition of the parallelism detector means 50, keeping the predetermined conditions of the electorstatic capacity coupling unchanged even if any inclination is produced between both electrode plates 10, 20 to some degree. For this reason, the detector circuit 40 includes an adder 46 as illustrated in FIG. 3.

In the phase discrimination type electrostatic capacity detector with such construction, the parallelism detector means 50 can detect parallelism between the one-side electrode plate 10 and the other-side electrode plate 20 easily and accurately when the one-side electrode plate 10 is mounted on a stationary body of a dial gauge type length measuring instrument together with the power supply 30 and the detector circuit 40 and the other-electrode plate 20 is mounted on the movable spindle, for example. Interconnection between the respective transmitting electrode elements (11a, 11b, . . .) and the power supply 30 is sufficient to connect the flexible wiring 16 to the terminal leads 15 located in close contact with the back surface 9B of the one-side electrode plate 10, and hence is achievable rapidly and easily.

Herein, by turning the power supply 30 on and applying supply voltage from the same to the respective transmitting electrode elements of the same phase through the flexible wiring 16, the respective terminal leads 15, and the respective coupling leads 13, the amount of displacement of the spindle with respect to the body of the dial gauge type length measuring instrument can be detected and displayed in a digitized manner on a display 47 of the detector circuit 40.

In accordance with the second embodiment, the respective transmitting electrode elements disposed in the second hierarchy layer are interconnected to each other in the first hierarchy layer through the coupling leads 13. The second embodiment therefore assures the identical operation and effects as those of the first embodiment such as miniaturization and cost reduction, etc., of the device.

Figure 15:
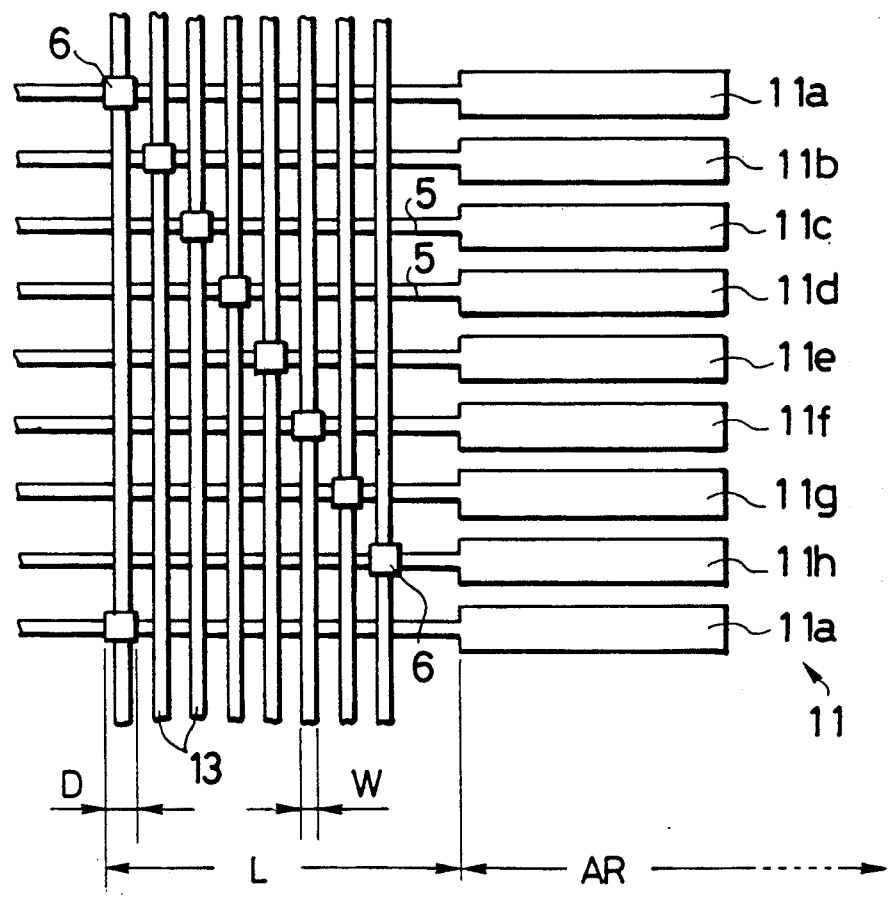
FIG. 15 is a view illustrating an interconnection relation between transmitting electrode elements and coupling leads.

Further, the receiving electrode 17 of the one-side electrode plate 10 is constructed with the pair of the receiving electrode elements 17A, 17B, and the parallelism detector means 50, which detects parallelism between the one-side electrode plate 10 and the other-side electrode plate 20 by comparing output signals from the respective receiving electrode elements 17A, 17B, is provided. Accordingly, the detector can easily be assembled into a handy miniaturized length measuring instrument and the like and adjusted, together with high precision detection of relative displacement between the one-side electrode plate 10 and the other-side electrode plate 20. In this occasion, it is not needed to provide a large space (connection area) in the electrostatic capacity coupling area AR as illustrated in FIG. 15 for interconnection between the transmitting electrode 11 and the power supply 30. It is thus possible also from this point of view to miniaturize the device and further promote the multifunction property of the device.

Additionally, the flexible wiring 16 is connected to the terminal leads 15 on the side of the back surface 9B of the one-side electrode plate 10, so that the connection work can be performed easily and rapidly together with the improvement of the reliability of the connection. Further, since the dimension (especially thickness) of the flexible wiring 16 does not matter, selection standard for electrical capacity and mechanical strength can be extended greatly, which is very advantageous in performance and cost.

Herein, although in the embodiments described above, the first electrical insulating layer 1 was adapted to cover the entire surface of the substrate 19 therewith, it is essential in that situation that the transmitting electrode 11 and the respective coupling leads 13 may be prevented from being short circuitted when the respective transmitting electrode elements 11a,11b, . . . of the same phase disposed in the second hierarchy layer are interconnected in series to each other in the first hierarchy layer formed below the second hierarchy layer through the respective coupling leads 13. Therefore, the electrical insulating layer may be provided partly between the transmitting electrode elements and the coupling leads 13.

In the following, a third preferred embodiment of the present invention will be described with reference to FIGS. 5 to 8.

Figure 3:
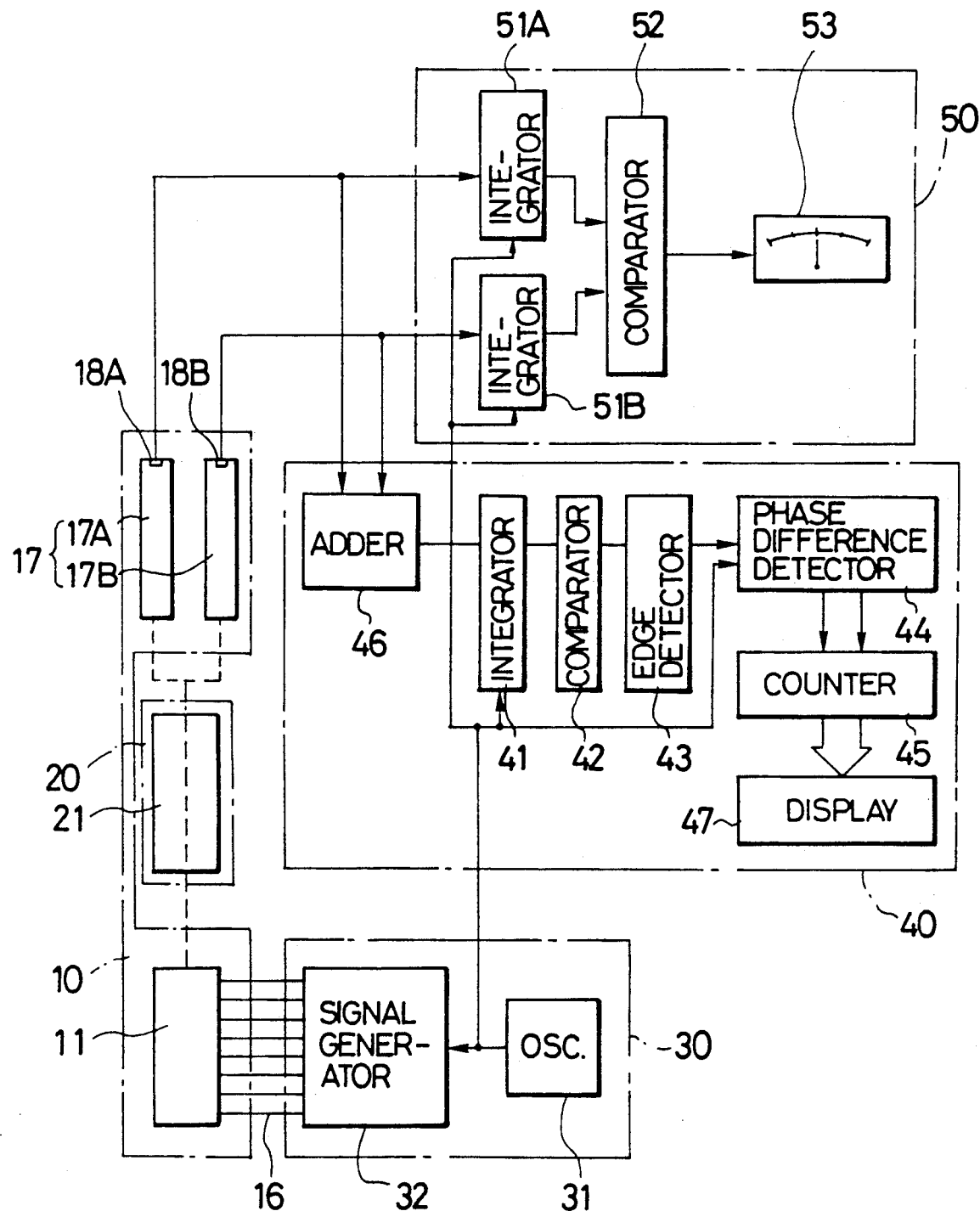
FIG. 3 is a block diagram illustrating the overall construction of a second embodiment according to the present invention.

The third embodiment comprises, as in the second embodiment shown in FIG. 3, an one-side electrode plate 10, another-side electrode plate 20, a power supply 30, a detector circuit 40, and parallelism detector means 50.

The power supply 30 and the detector circuit 40 are identical to the conventional ones illustrated in FIG. 10, and hence the description will be omitted.

Figure 5:
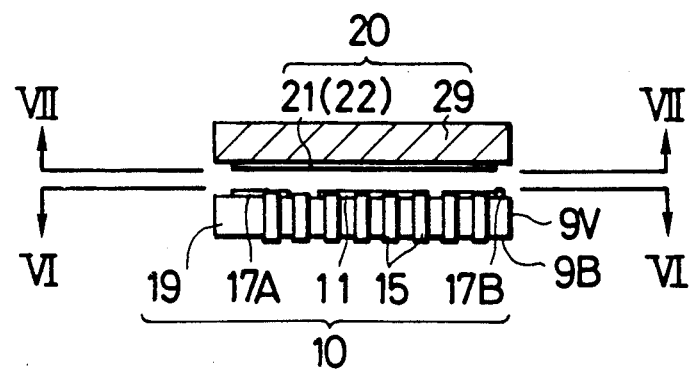
FIG. 5 is a front view illustrating a portion of a third embodiment according to the present invention.

The one-side electrode plate 10 comprises, as illustrated in FIGS. 5 and 6, a substrate 19 made of a glass plate, a transmitting electrode 11 including a plurality of transmitting electrode element units composed of a plurality (eight) of transmitting electrode elements 11a to 11h, the units being disposed in order, and a receiving electrode 17 composed of a pair of receiving electrode elements 17A, 17B, between which the transmitting electrode 11 is interposed and restricted in its width direction.

On the contrary, the other-side electrode plate 20 comprises a glass plate substrate 29, coupling electrodes 21, each electrode having its length ranging over the four transmitting electrode elements (11a to 11d, 11e to 11h) and its width ranging over both receiving electrode elements 17A, 17B, and earth electrodes 22 disposed alternately with respect to the coupling electrodes 21, each earth electrode having the same shape as that of each coupling electrode 21, and the respective earth electrode 22 being mutually short-circuitted through a short-circuit pattern 23.

The present invention herein has the following construction as a technical feature as illustrated in FIGS. 5 and 6: respective coupling leads 13 are led out to the one side end 19a of the one-side electrode plate 10 through a space between the receiving electrode elements 17A, 17B, and respective terminal leads 15 are formed of conductive coatings disposed in close contact with the side surface 9V or back surface 9B of the substrate 19 of the one-side electrode plate 10.

In more detail, the respective transmitting electrode elements of the respective transmitting electrode element units, which elements have the same phase, 11a and 11a for example, are connected to the same coupling leads 13 through respective extension leads 5, and the respective coupling leads 13 are led out to the lower portion of FIG. 6 through a space between both receiving electrode elements 17A, 17B.

To be concrete, the respective extension leads 5 are formed on the surface of the substrate 19, and covered with a first insulating layer 1 comprising a silicon dioxide (SiO$_2$) film. The respective coupling leads 13 are formed on the first insulating layer 1, and connected to the corresponding extension leads 5 through throughholes 3 formed through the first insulating layer 1. The entire surface of the device is covered with a second insulating layer 2 comprising a silicon dioxide (SiO$_2$) film. The transmitting electrode elements and the receiving electrode elements have of course been formed on the substrate 19 as the extension leads 5.

Figure 8:
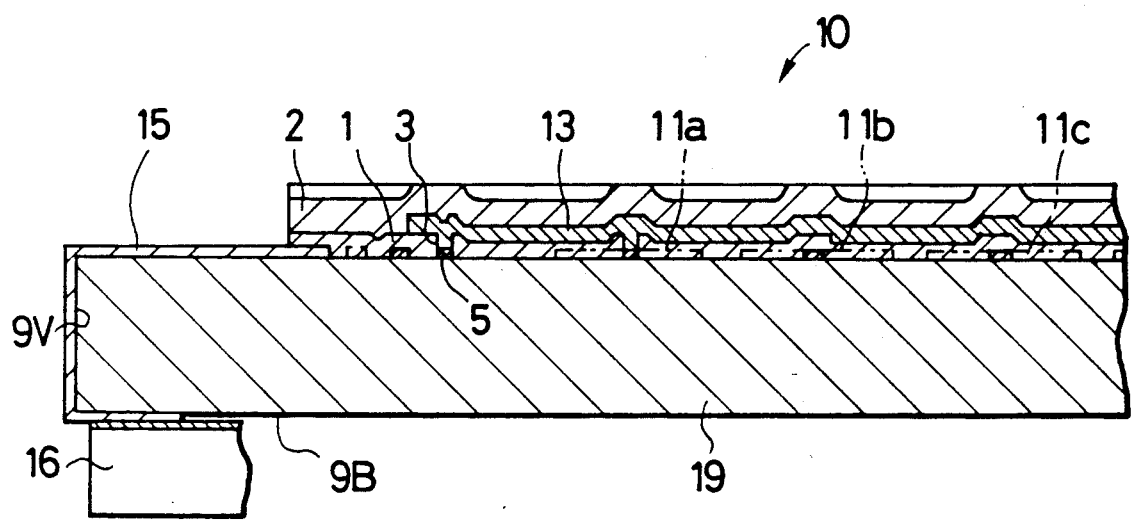
FIG. 8 is a side sectional view illustrating the portion of the third embodiment, partly omitted and taken along a line VIII—VIII of FIG. 6.

Terminals provided on the tips of the respective coupling leads 13, that is the respective terminal leads 15 to interconnect the respective coupling leads 13 with the flexible wiring 16 are closely formed in a body over the surface, side surface 9V, back surface 9B of the substrate 19, as illustrated in FIG. 8. Those terminals are formed in the present embodiment by sputtering with use of a metal mask.

The respective coupling leads 13 and the power supply 30 (signal generator 32) are interconnected through the flexible wiring 16 connected to the respective terminal leads 15 on the side of the back surface 9B of the one-side electrode plate 10.

In accordance with the third embodiment, the respective coupling leads 13 which interconnect the respective transmitting electrode elements of the same phase are led out to the one side end 19a of the one-side electrode plate 10 through a space between the pair of the receiving electrode elements 17A, 17B, and the respective terminal leads 15 are formed of the conductive coatings located in close vicinity to each other on the side surface 9V and back surface 9B of the substrate 19. Accordingly, the one-side electrode plate 10 may not be large-sized, compared with the prior example illustrated in FIG. 16 wherein the respective coupling leads 13 are connected to the flexible wiring 16 after going outside the capacity coupling area AR. Additionally, there is no need of providing the stepped portion 19b in the substrate 19 of the one-side electrode plate 10 within the electrostatic capacity coupling area AR as illustrated in FIGS. 17 and 18. Accordingly, manufacturing cost is prevented from increasing. Therefore, there can be established an economical, miniaturized phase discrimination type electorstatic capacity detector capable of stable, high presicion detection.

Moreover, the respective terminal leads 15 are each formed of the conductive coatings by sputtering, each of which is ultra-thin and highly adhesive. Therefore, the transmitting electrode 11 and the power supply 30 can securely be interconnected, and the terminal leads 15 and the flexible wiring 16 can be disposed without protruding into a space between both electrode plates 10, 20. Thus, reliability of the device can further be improved.

Furthermore, since there is provided the parallelism detector means 50, both electrode plates 10, 20 can not only be assembled and adjusted with ease, but also a relative positional relation between both electrode plates 10, 20 can be kept in a predetermined manner also from the view point of the formation of the receiving electrode 17 with the pair of the receiving electrode 11 therebetween, to keep stably the electrostatic capacity coupling between both electrode plates 10, 20.

Although, in the third embodiment, the terminal leads 15 were laid to extend from the side surface 9V of the one-side electrode plate 10 to the back surface 9B of the same, they may be arranged to terminate at the side surface 9V of the one-side electrode plate 10.

Additionally, although the terminal leads 15 were provided on the tips of the coupling lead 13, it is obvious that, when the coupling leads 13 are prepared with their width made constant, the tips of those coupling leads 13 should be understood to form the terminal leads 15. But, if each terminal lead 15 would be formed using a wider member than the coupling lead 13 as in the above-described embodiment interconnection of the terminal lead 15 with the flexible wiring 16 could be performed with ease and contact resistance therebetween could further be reduced. Additionally, the respective terminal leads 15 laid over the side surface 9V and back surface 9B of the substrate 19 can directly be formed by sputtering.

Moreover, although the output leads 18A, 18B were led out at the one side end, in a width direction, of the one-side electrode plate 10, they may be led out in a longitudinal direction of the one-side electrode plate 10 as in the coupling leads 13 and formed on the side surface 9V and back surface 9B of the substrate 19, in order to further reduce the size of the one-side electrode plate 10 in the width direction of the same.

Figure 9:
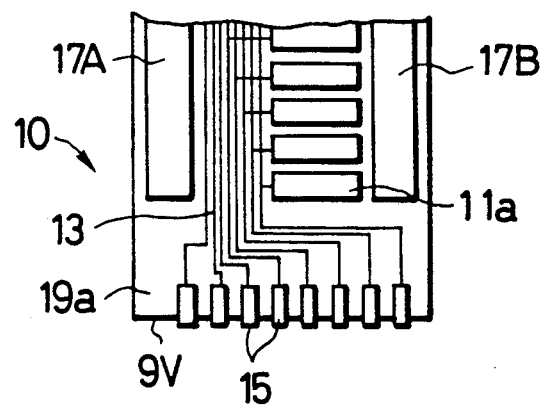
FIG. 9 is a view illustrating a fourth embodiment according to the present invention with a modified wiring pattern of coupling leads.

Furthermore, although the coupling leads 13 were disposed at righthand and lefthand sides with respect to the transmitting electrode 11 four for each side, the route of laying of each coupling lead 13 may arbitrarily selected. For example, as a fourth preferred embodiment illustrated in FIG. 9, the coupling lead 13 may be concentrated on one side (lefthand side in the figure) of the transmitting electrode 11. It is essential that they may be led out to the one side end 19a of the substrate 19 between both receiving electrode elements 17A, 17B.

Although certain preferred embodiments have been shown and described, it should be understood that many changes and modifications may be made therein without departing from the scope of the appended claims.

What is claimed is:

1. A phase discrimination type electrostatic capacity detector comprising a one-side electrode plate composed of a transmitting electrode and of a receiving electrode, another-side electrode plate having a coupling electrode and disposed relatively movably with respect to said one-side electrode plate in a confronting relation with the same, a power supply connected to said transmitting electrode, and a detector circuit connected to said receiving electrode, characterized in that
    said one-side electrode plate having a substrate formed of a hard-workable material is partitioned on one of the surfaces of the substrate into first and second hierarchy layers by an electrical insulating layer,
    a plurality of transmitting electrode elements, which constitute said transmitting electrode, are disposed in said second hierarchy layer and allowed to penetrate at ends thereof through said electrical insulating layer and extend into said first hierarchy layer,
    said transmitting electrode elements of the same phase and disposed adjacent to each other are interconnected through coupling leads obliquely oriented with respect to said transmitting electrode elements and in series from the transmitting electrode elements at one side to the transmitting electrode elements at the other side in said first hierarchy layer, and
    said respective transmitting electrode elements of the same phase are supplied with an electric signal of said same phase from said power supply through the respective coupling leads.

2. A phase discrimination type electrostatic capacity detector according to claim 1 characterized in that said receiving electrode is disposed in said first hierarchy layer together with the coupling leads, connection terminals, and terminal leads.

3. A phase discrimination type electrostatic capacity detector according to claim 1 characterized in that the respective transmitting electrode elements have substantially the same width as that of connection terminals, and are connected to pairs of corresponding connection terminals through downward leads arranged in a-straight line, respectively.

4. A phase discrimination type electrostatic capacity detector comprising a one-side electrode plate formed of hard-workable material, and composed of a transmitting electrode and of a receiving electrode including a pair of receiving electrode elements between which said transmitting electrode plate is interposed, another-side electrode plate having coupling electrodes and disposed relatively movably with respect to said one-side electrode plate in a confronting relation with the same, a power supply connected to said transmitting electrode, and a detector circuit connected to said receiving electrode, characterized in that coupling leads interconnecting respective transmitting electrode elements of the same phase of a plurality of transmitting electrode element units, which constitute said transmitting electrode, are led out to a one-side end of said one-side electrode plate through a space between said both receiving electrode elements, and respective terminal leads provided on the tips of the respective coupling leads, for interconnecting the respective coupling leads and said power supply, are disposed at intervals and are formed of conductive coating disposed in close vicinity to each other on at least a side surface of the one side end of the one-side electrode plate.

* * * * *